(12) United States Patent
Huang

(10) Patent No.: US 7,093,327 B2
(45) Date of Patent: Aug. 22, 2006

(54) STRAP FASTENER SET

(76) Inventor: Han-Ching Huang, No. 12, Alley 111, Lane 437, Chen Hsing Road, Taichung (TW)

( * ) Notice: Subject to any disclaimer, the term of this patent is extended or adjusted under 35 U.S.C. 154(b) by 0 days.

(21) Appl. No.: 10/780,195

(22) Filed: Feb. 17, 2004

(65) Prior Publication Data

US 2005/0177984 A1 Aug. 18, 2005

(51) Int. Cl.
*B60P 7/08* (2006.01)

(52) U.S. Cl. .................. 24/68 CD; 24/909; 73/862.194

(58) Field of Classification Search ................ 254/217, 254/218, 237, 238, 222, 223, 243, 250–252, 254/256, 257; 24/68 R, 68 CD, 69 CT, 69 ST, 24/71 ST, 71 TD, 909, 170, 171, 191, 193, 24/194, 196; 73/862.44, 862.194, 862.42; D8/44, 383

See application file for complete search history.

(56) References Cited

U.S. PATENT DOCUMENTS 310,845 A * 1/1885 Overbagh .................. 254/213
942,006 A * 11/1909 Morehead .................. 254/223
2004/0104380 A1 * 6/2004 Huang ........................ 24/68 R

FOREIGN PATENT DOCUMENTS

| DE | 8215729.4 | 8/1982 |
| DE | 3240993 A1 * | 6/1983 |
| DE | 3248789 | 7/1984 |
| DE | 10250807 | 5/2003 |
| GB | 2021275 | 11/1979 |
| WO | WO 94/11220 | 5/1994 |

* cited by examiner

*Primary Examiner*—James R. Brittain

(57) ABSTRACT

A strap fastener set, capable of providing a reading of a tensile force exerted thereon, includes a strap fastener for winding a first strap and a gauge provided between the strap fastener and a second strap. The gauge includes a cylinder tied with the second strap. The cylinder includes a window defined therein and a scale provided thereon along the window. A first ring is secured to the cylinder. A spring is put in the cylinder. A rod extends past the ring through the spring for connection with the strap fastener. A second ring is secured to the rod so that it is moved relative to the cylinder so as to compress the spring against the first ring when a tensile force is exerted on the straps. The second ring includes an indicator formed thereon for cooperation with the scale so as to provide a reading of the tensile force.

11 Claims, 5 Drawing Sheets

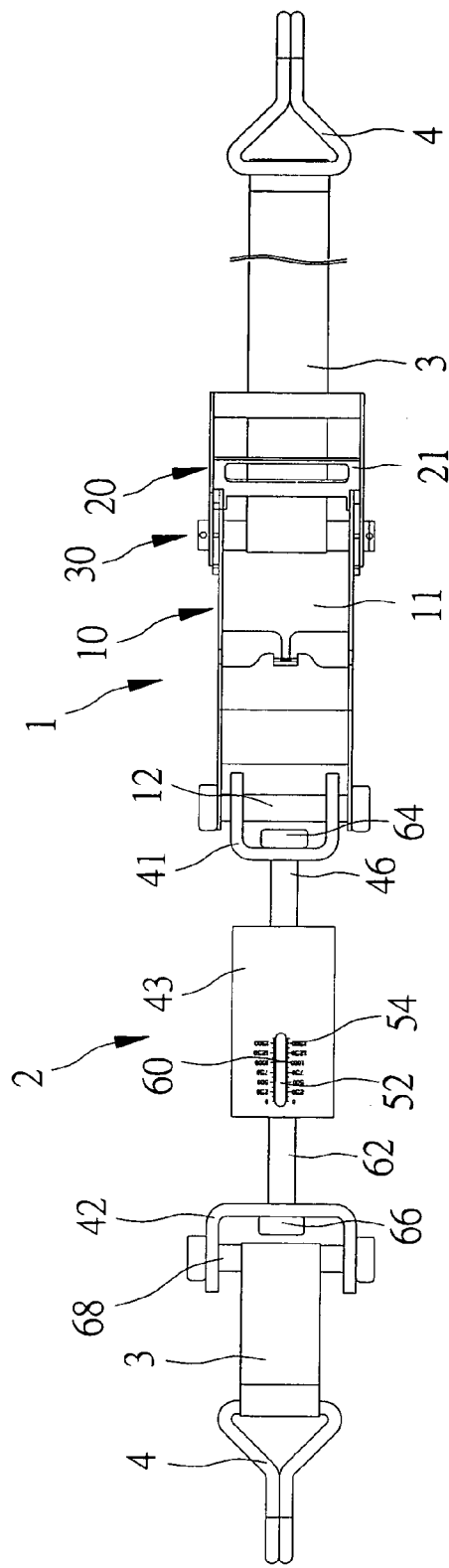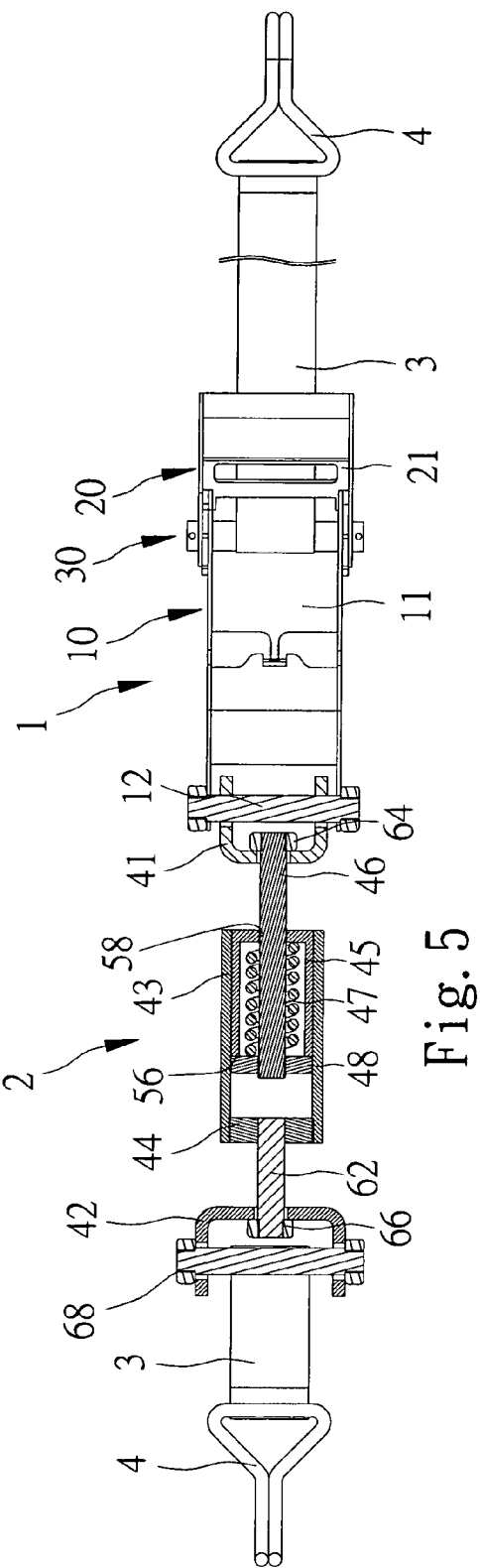

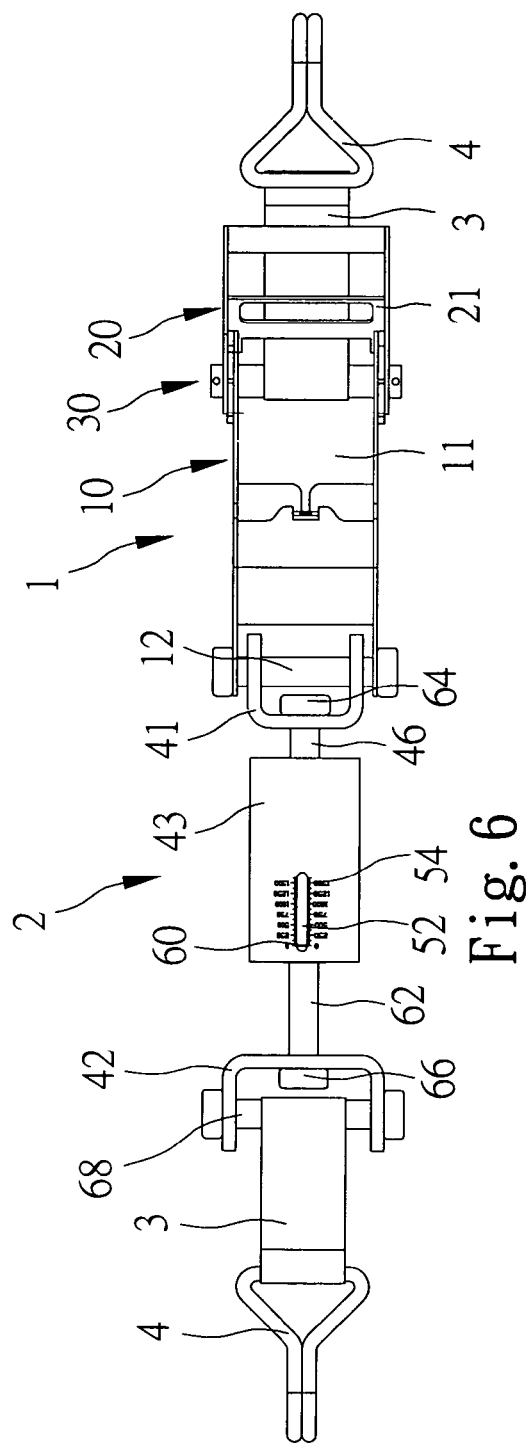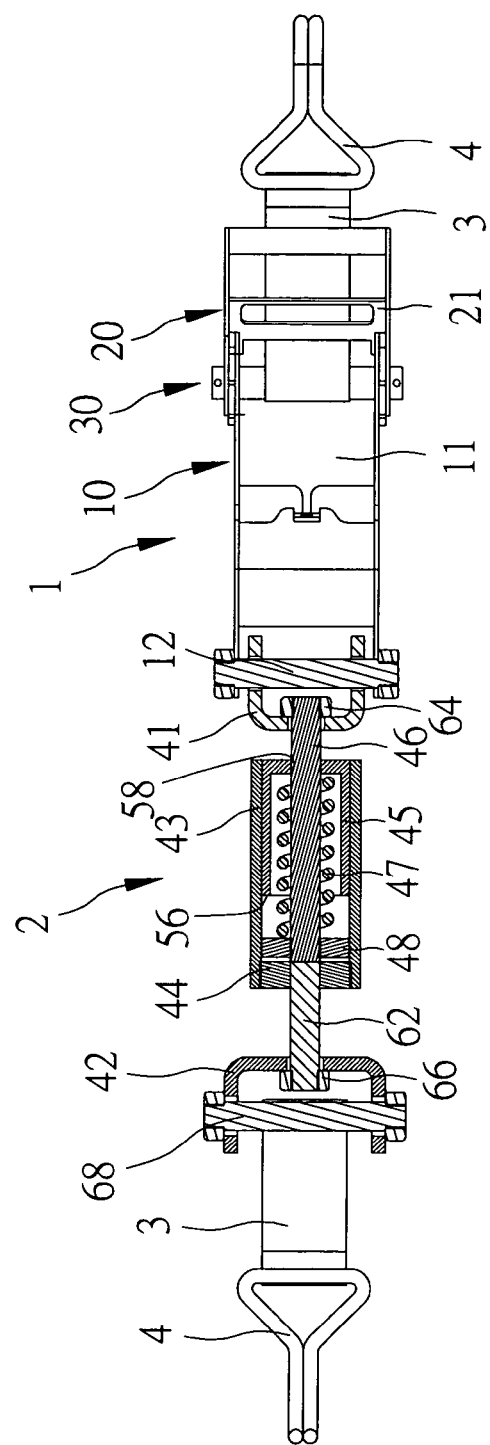

STRAP FASTENER SET

FIELD OF INVENTION

The present invention relates to a strap fastener set capable of providing a reading of a tensile force exerted thereon.

BACKGROUND OF INVENTION

A typical strap fastener includes a base, a reel pivotal on the base, a lever pivotally installed on the reel, two ratchet wheels secured to the reel, a first detent movably installed on the base for engagement with the ratchet wheels and a second detent movably installed on the lever for engagement with the ratchet wheels. In use, a first strap or a first end of a strap is tied to the base. A second strap or a second end of the strap is wound on the reel. The lever is pivoted relative to the base in order to perform a one-way rotation of the reel through cooperation of the detents with the ratchet wheels. The reel winds the first strap or the first end of the strap so as to exert a tensile force on the straps or the strap. The tensile force may however be too large for the straps or the strap to sustain. In such a case, the straps or the strap may be fractured. When that happens, cargo will get loose and become vulnerable to damage. What is worse is that the loose cargo may hurt people.

The present invention is therefore intended to obviate or at least alleviate the problems encountered in the prior art.

SUMMARY OF INVENTION

It is the primary objective of the present invention to provide a strap fastener set capable of providing a reading of a tensile force exerted thereon.

According to the present invention, a strap fastener set includes a strap fastener for winding a first strap and a gauge provided between the strap fastener and a second strap. The gauge includes a cylinder tied with the second strap. The cylinder includes a window defined therein and a scale provided thereon along the window. A first ring is secured to the cylinder. A spring is put in the cylinder. A rod extends past the ring through the spring for connection with the strap fastener. A second ring is secured to the rod so that it is moved relative to the cylinder so as to compress the spring against the first ring when a tensile force is exerted on the straps. The second ring includes an indicator formed thereon for cooperation with the scale so as to provide a reading of the tensile force.

Other objectives, advantages and novel features of the invention will become more apparent from the following detailed description when taken in conjunction with the attached drawings.

BRIEF DESCRIPTION OF DRAWINGS

The present invention will be described via detailed illustration of the preferred embodiment referring to the attached drawings.

FIG. 4 is a top view of the strap fastener set shown in FIG. 2.

FIG. 5 is a cross-sectional view of the gauge shown in FIG. 4.

FIG. 6 is similar to FIG. 4 but shows the strap fastener set in a different position.

FIG. 7 is a cross-sectional view of the gauge shown in FIG. 6.

DETAILED DESCRIPTION OF PREFERRED EMBODIMENT

Figure 1:
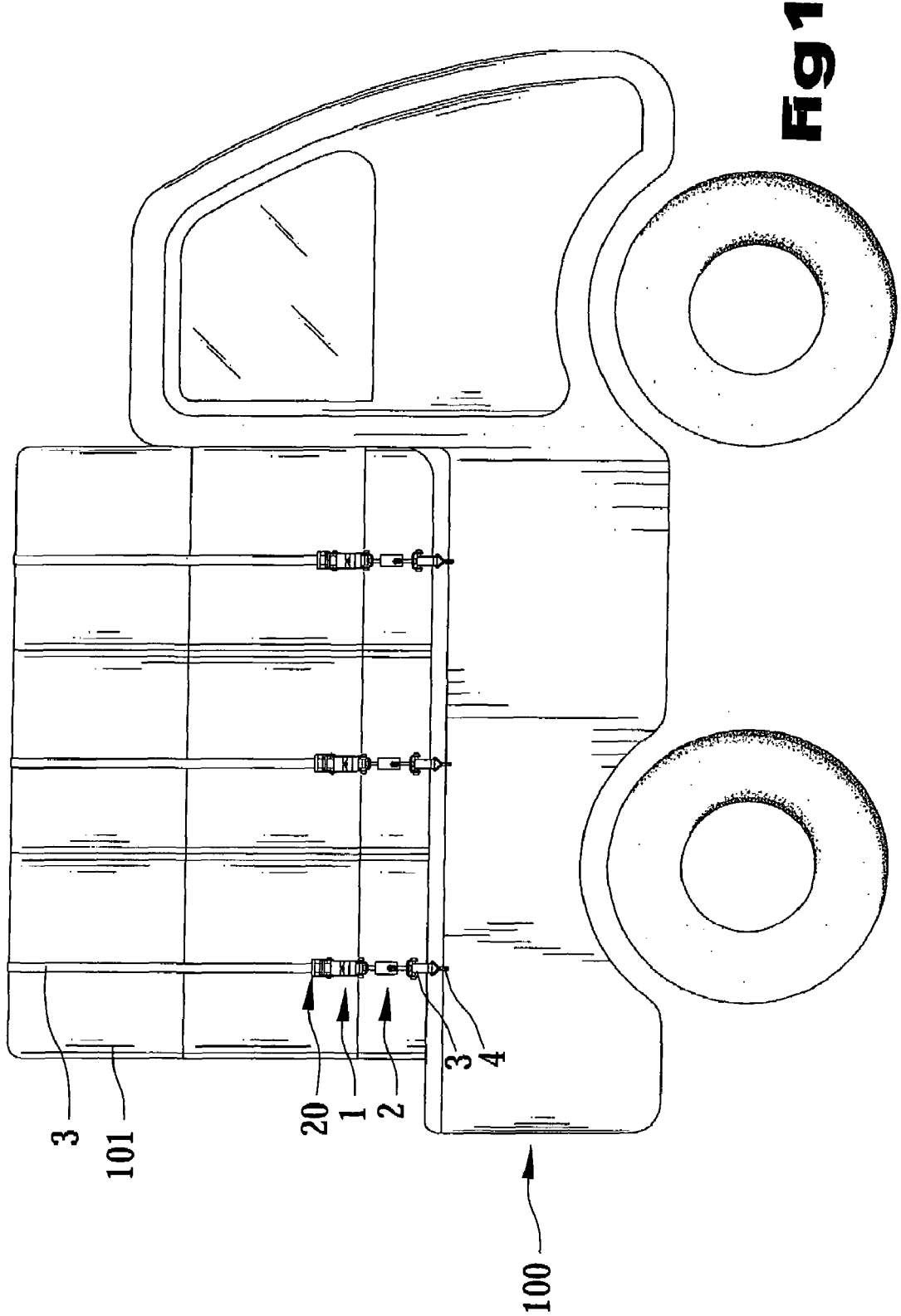
FIG. 1 is a side view of a truck on which cargo is held by straps and strap fastener sets according to the preferred embodiment of the present invention.

FIG. 1 shows a truck 100 on which cargo 101 is held by three pairs of straps 3 and three strap fastener sets according to the preferred embodiment of the present invention. Each strap 3 is tied with a hook 4 for hooking to the truck 100. Each strap fastener set includes a strap fastener 1 connected with one strap 3 of the pair of straps 3 and a gauge 2 tied with the other strap 3 of that pair of straps 3. The following description will be focused on only one strap fastener set and only one pair of straps 3.

Figure 2:
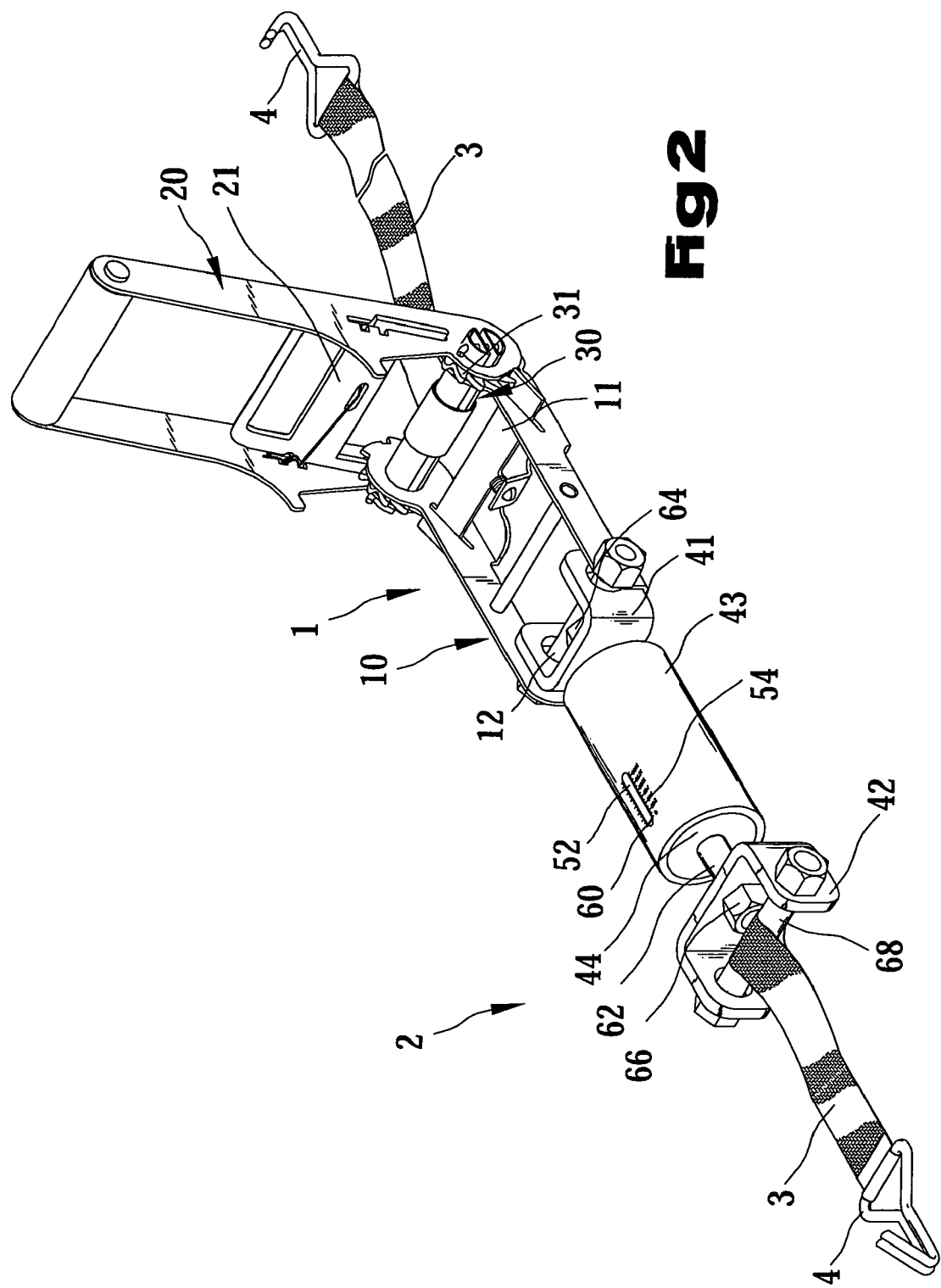
FIG. 2 is a perspective view of one of the strap fastener sets shown in FIG. 1, including a strap fastener and a gauge.
Figure 3:
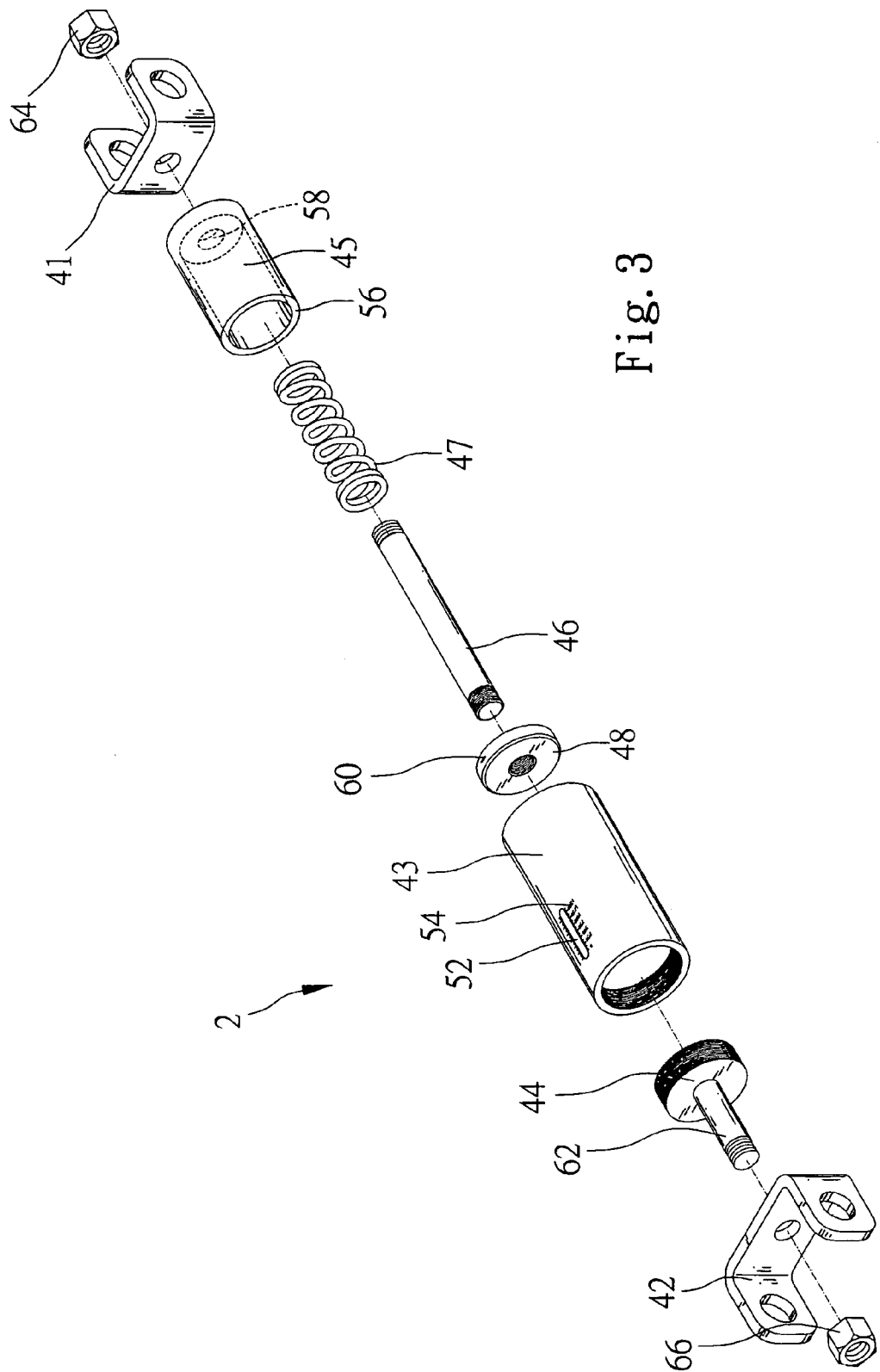
FIG. 3 is an exploded view of the gauge shown in FIG. 2.

Referring to FIG. 2, the strap fastener 1 includes a base 10, a reel 30 pivotally mounted on the base 10, a lever 20 pivotally installed on the reel 30, two ratchet wheels 31 secured to the reel 30, a first detent 11 movably installed on the base 10 for engagement with the ratchet wheels 31 and a second detent 21 movably installed on the lever 20 for engagement with the ratchet wheels 31. In use, the first strap 3 is wound on the reel 30. The lever 20 is pivoted relative to the base 10 so as to provide a one-way rotation of the reel 30 through cooperation of the detents 11 and 21 with the ratchet wheels 31. The reel 30 winds the first strap 3. Being conventional, the strap fastener 1 will not be described in detail.

Referring to FIGS. 2–5, the gauge 2 includes a cylinder 43 with a window 52 in the form of a slot defined therein and a scale 54 formed thereon along the window 52.

A cap 45 is secured to the cylinder 43 without blocking the window 52. The cap 45 includes a cylinder 56 and an annular flange 58 defining a ring formed on an internal side of the cylinder 56. The cylinder 56 of the cap 45 may be fit in the cylinder 43. Alternatively, the cylinder 56 of the cap 45 may be secured to the cylinder 43 by welding. In a simplified embodiment, the cap 45 and the cylinder 43 are merged. In other words, the cap 45 is saved while an annular flange such as the annular flange 58 of the cap 45 is formed on an internal side of the cylinder 43.

A spring 47 is put in the cylinder 43. A rod 46 is substantially inserted in the cylinder 43. A first end of the rod 46 is inserted past the annular flange 58 of the cap 45. A ring 48 is put in the cylinder 43 and secured to a second end of the rod 46. In a simplified embodiment, the ring 48 and the rod 46 are merged. The spring 47 is compressed between the ring 48 and the annular flange 58 of the cap 45. The ring 48 is provided with an indicator 60 that is observed through the window 52. The indicator 60 cooperates with the scale 54 in order to provide a reading of a tensile force exerted on the gauge 2.

A ring 44 is secured to the cylinder 43 by screwing. A bolt 62 is secured to the ring 44. In a simplified embodiment, the ring 44 and the bolt 62 are made as one.

In a simplified embodiment, the ring 44 and the cylinder 43 are merged. However, it should be noted that only one of the ring 44 and the cap 45 is merged with the cylinder 43.

The rod 46 of the gauge 2 is connected with the base 10 of the strap fastener 1 by a first joint 41. The bolt 62 of the gauge 2 is connected with the second strap 3 by a second joint 42. The first joint 41 includes a middle section and two terminal sections extending from the middle section. The first end of the rod 46 passes through the middle section of the first joint 41 and threadably receives a nut 64. A bolt 12 is driven into the terminal sections of the first joint 41 through two lateral sections of the base 10, thus pivotally connecting the first joint 41 with the base 10.

The second joint 42 includes a middle section and two terminal sections extending from the middle section. The bolt 62 passes through the middle section of the second joint 42 and threadably receives a nut 66. Into the terminal sections of the second joint 42 is driven a bolt 68 to which the second belt 3 is secured.

Referring to FIGS. 6 and 7, subject to a tensile force, the first strap 3 is pulled away from the second strap 3. The spring 47 is compressed between the ring 48 and the annular flange 58 of the cap 45. The ring 48 is moved in the cylinder 43. That is, the indicator 60 is moved with respect to the scale 54 in order to provide a reading of the tensile force exerted on the gauge 2.

The present invention has been described via illustration of the preferred embodiment. The applicant gives the preferred embodiment only as an example, and those skilled in the art can derive variations from the preferred embodiment after a study of this specification. Therefore, the preferred embodiment shall not limit the scope of the present invention that is defined in the following claims.

The invention claimed is:

1. A strap fastener set including a strap fastener for winding a first strap and a gauge provided between the strap fastener and a second strap, wherein the gauge includes:
   a cylinder tied with the second strap, the cylinder including a window defined therein and a scale provided thereon along the window;
   a first ring secured to the cylinder;
   a spring in the cylinder;
   a rod extending past the first ring through the spring for connection with the strap fastener;
   a second ring secured to the rod so that it is moved relative to the cylinder so as to compress the spring against the first ring as a tensile force is exerted on the straps, the second ring including an indicator formed thereon for cooperation with the scale in order to provide a reading of the tensile force; and
   a joint for connecting the rod with the strap fastener, wherein the joint includes a middle section pivotally connected with the rod and two terminal sections pivotally connected with the strap fastener.

2. The strap fastener set according to claim 1 wherein the first ring is integrally formed on an internal side of the cylinder.

3. The strap fastener set according to claim 1 wherein the second ring is integrally formed on the rod.

4. The strap fastener set according to claim 1 including a third ring secured to the cylinder for connection with the second strap.

5. The strap fastener set according to claim 1 wherein the straps are integrated with each other.

6. The strap fastener set according to claim 1 wherein the strap fastener includes base, a reel pivotally put on the base, a lever pivotally installed on the reel, two ratchet wheels secured to the reel, a first detent movably installed on the base for engagement with the ratchet wheels and a second detent movably installed on the lever for engagement with the ratchet wheels, and the lever can be pivoted relative to the base so as to provide a one-way rotation of the reel via cooperation of the detents with the ratchet wheels.

7. A strap fastener set including a strap fastener for winding a first strap and a gauge provided between the strap fastener and a second strap, wherein the gauge includes:
   a cylinder tied with the second strap, the cylinder including a window defined therein and a scale provided thereon along the window;
   a first ring secured to the cylinder;
   a spring in the cylinder;
   a rod extending past the first ring through the spring for connection with the strap fastener;
   a second ring secured to the rod so that it is moved relative to the cylinder so as to compress the spring against the first ring as a tensile force is exerted on the straps, the second ring including an indicator formed thereon for cooperation with the scale in order to provide a reading of the tensile force;
   a third ring secured to the cylinder for connection with the second strap; and
   a bolt secured to the third ring for connection with the second strap.

8. The strap fastener set according to claim 7 including a joint for connecting the rod with the strap fastener.

9. The strap fastener set according to claim 7 wherein the bolt is integrally formed on to the third ring.

10. The strap fastener set according to claim 7 including a joint for connecting the second strap with the bolt.

11. The strap fastener set according to claim 7 wherein the joint includes a middle section pivotally connected with the bolt and two terminal sections for supporting a pin to which the second strap is tied.

\* \* \* \* \*